United States Patent
Hauser et al.

(10) Patent No.: US 6,652,245 B2
(45) Date of Patent: Nov. 25, 2003

(54) PISTON PUMP FOR HYDRAULIC VEHICLE BRAKE SYSTEM

(75) Inventors: Manfred Hauser, Schwieberdingen (DE); Norbert Alaze, Markgroeningen (DE); Thorsten Duermeier, Vaihingen/Enz (DE); Ursula Eckstein, Schwieberdingen (DE); Erika Mank, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,730

(22) PCT Filed: Mar. 24, 2001

(86) PCT No.: PCT/DE01/01156

§ 371 (c)(1),
(2), (4) Date: Mar. 27, 2002

(87) PCT Pub. No.: WO01/73294

PCT Pub. Date: Oct. 4, 2001

(65) Prior Publication Data

US 2002/0155008 A1 Oct. 24, 2002

(30) Foreign Application Priority Data

Mar. 28, 2000 (DE) .......................................... 100 15 295

(51) Int. Cl.[7] ................................................ F04B 53/20
(52) U.S. Cl. ........................ 417/313; 417/470; 417/549; 417/554; 92/78; 60/454
(58) Field of Search ................................ 417/313, 470, 417/549, 554; 92/78; 60/454

(56) References Cited

U.S. PATENT DOCUMENTS

| 6,082,244 A | * | 7/2000 | Siegel et al. ..................... 92/78 |
| 6,302,663 B1 | * | 10/2001 | Schuller et al. ............. 417/554 |
| 6,341,950 B1 | * | 1/2002 | Schuller et al. ............. 417/554 |
| 2001/0002978 A1 | * | 6/2001 | Siegel et al. ................. 417/470 |

* cited by examiner

Primary Examiner—Charles G. Freay
Assistant Examiner—Emmanuel Sayoc
(74) Attorney, Agent, or Firm—Ronald E. Greigg

(57) ABSTRACT

The invention relates to a piston pump for a hydraulic, slip-controlled vehicle brake system. The piston pump has a piston, which is inserted with a part of its length into a sleeve. A tubular filter that encompasses the piston is attached to the sleeve and constitutes a captive retainer, which secures the piston in a captive fashion in the sleeve. In order to reduce an axial mobility of a sealing ring that seals the piston in the pump housing, the invention proposes attaching the filter, which limits the axial mobility of the sealing ring, to the sleeve in an axially mobile fashion.

6 Claims, 2 Drawing Sheets

PISTON PUMP FOR HYDRAULIC VEHICLE BRAKE SYSTEM

CROSS-REFERENCE TO RELATED APPLICATIONS

This application is a 35 USC 371 application of PCT/DE 01/01156 filed on Mar. 24, 2001.

BACKGROUND OF THE INVENTION

1. Field of the Invention

The invention relates to a piston pump which is particularly provided for a hydraulic vehicle brake system that has a traction control system.

2. Description of the Prior Art

A piston pump of this kind has been disclosed by DE 197 32 817 A1. The known piston pump has a piston which is contained in an axially mobile fashion over a part of its length in a sleeve. Together with the sleeve, the piston can be inserted into a pump bore of a pump housing, where the piston, in a section protruding from the sleeve, is guided in an axially mobile fashion in the pump bore in the pump housing. A tubular filter, which encompasses the piston in its section protruding from the sleeve, is placed onto the sleeve in such a way that it extends the sleeve. The filter constitutes a captive retainer, which engages behind an undercut, for example an annular step of the piston, and thus secures the piston in the sleeve. The sleeve, the piston, and the filter securing the piston in the sleeve comprise a preassembled unit, which is assembled outside the pump housing and is then inserted into the pump bore in the pump housing. The filter constituting the captive retainer is intended to secure the piston in the sleeve until the preassembled unit is inserted into the pump bore in the pump housing. When the preassembled unit is inserted into the pump housing, the piston is secured in the sleeve by means of a cam that drives it so that it is no longer necessary for the filter to retain the piston in captive fashion.

A sealing ring is inserted in order to seal the piston in the pump housing and a guide ring is inserted into the pump bore in the imaginary extension of the filter in order to axially guide the piston in the pump housing. In order to compensate for length tolerances, in the known piston pump, a comparatively large amount of play must be provided in the axial direction between the filter and the sealing ring; the sealing ring has a large amount of axial play. This has the disadvantage that the sealing ring can move toward the filter during an intake stroke of the piston pump, which reduces an intake volume and thereby reduces an efficiency of the piston pump. In addition, due to an axial movement during the stroke motion of the piston, the sealing ring can convey a leakage flow from the piston pump into a cam chamber and can aspirate air into the piston pump in the reverse direction, which likewise impairs pump performance.

SUMMARY OF THE INVENTION

In the piston pump according to the invention, the filter is attached to the sleeve in an axially mobile fashion. This results in the fact that the filter assumes its final axial position in relation to the sleeve only when the sleeve is inserted together with the piston and filter into the pump bore in the pump housing. The invention achieves a tolerance compensation in the axial direction between the sleeve and the filter attached to it that permits an axial play for a sealing ring, which seals the piston in the pump housing, to be embodied within strict tolerances. This has the advantage that an undesirable axial mobility of the sealing ring can be reduced and can even be eliminated, provided that the sealing ring permits this. This prevents leakage fluid from being conveyed by axial movement of the sealing ring due to a stroke motion of the piston of the piston pump. In addition, a wear of the sealing ring is reduced and the sealing ring is prevented from reducing the intake volume of the piston pump according to the invention by moving axially during an intake stroke of its piston.

The piston pump according to the invention is particularly provided as a pump in a brake system of a vehicle and is used to control the pressure in wheel brake cylinders. Depending on the type of brake system, these brake systems are referred to by the abbreviations ABS, TCS, ESP, or EHB. In the brake system, the pump is used, for example, to return brake fluid from one or more of wheel brake cylinders to a master cylinder (ABS) and/or for supplying brake fluid from a reservoir into one or more of wheel brake cylinders (TCS, ESP, or EHB). The pump is required, for example, in a brake system with a wheel slip regulation (ABS or TCS) and/or in a brake system used as a steering aid (ESP) and/or in an electrohydraulic brake system (EHB). Wheel slip regulation (ABS or TCS) can, for example, prevent the wheels of the vehicle from locking when there is powerful pressure on the brake pedal during a braking maneuver (ABS) and/or can prevent the driven wheels of a vehicle from spinning when there is powerful pressure on the accelerator pedal. In a brake system used as a steering aid (ESP), a brake pressure is built up in one or more wheel brake cylinders, independent of an actuation of the brake pedal or accelerator pedal, in order, for example, to prevent the vehicle from swerving out from the path desired by the driver. The pump can also be used in an electrohydraulic brake system (EHB) in which the pump supplies brake fluid to the wheel brake cylinder(s) when an electric brake pedal sensor detects an actuation of the brake pedal or in which the pump is used to fill a reservoir of the brake system.

BRIEF DESCRIPTION OF THE DRAWINGS

The invention will be explained in detail below in conjunction with the drawings, in which.

DESCRIPTION OF THE PREFERRED EMBODIMENT

Figure 1:
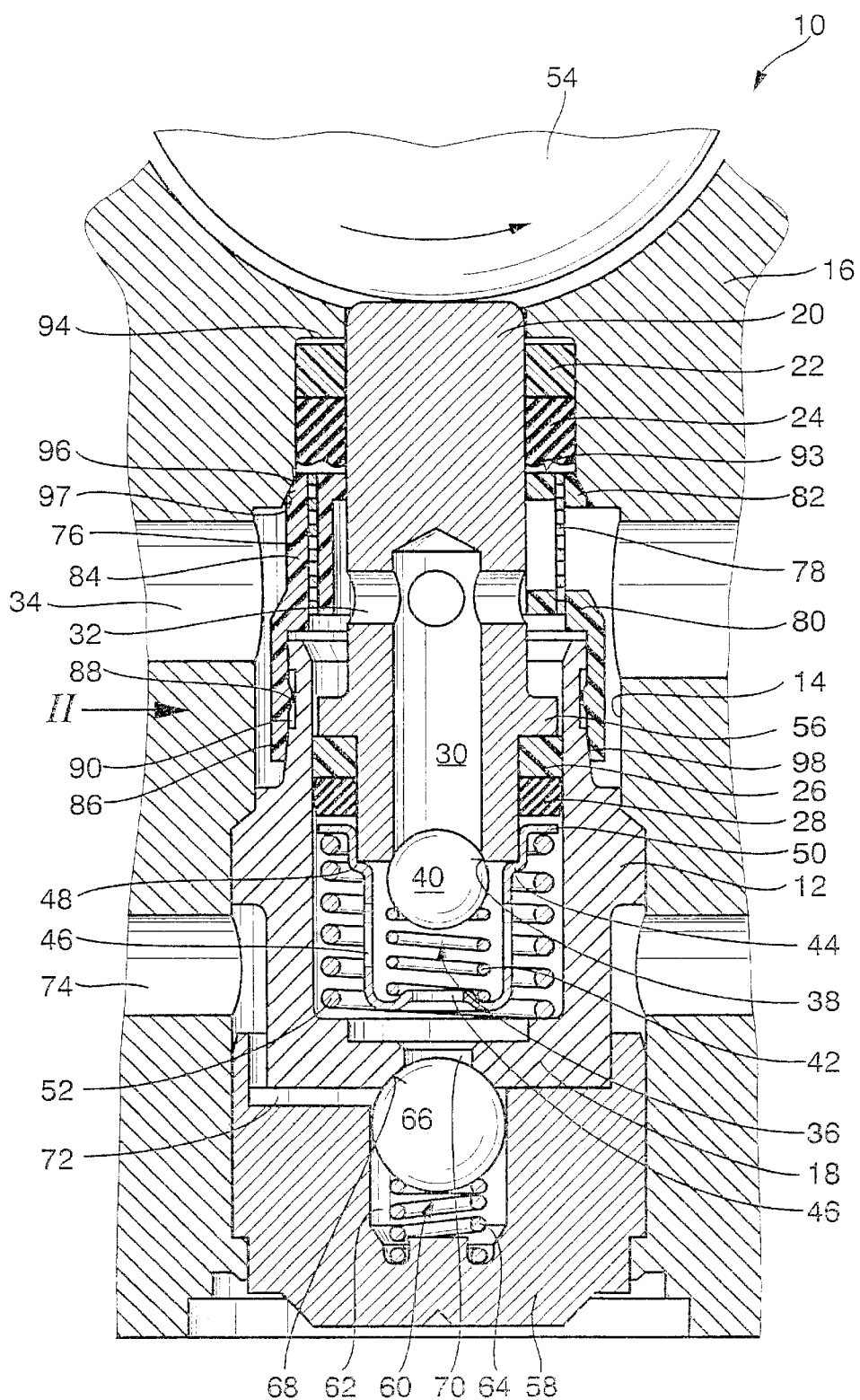
FIG. 1 shows an axial section through a piston pump according to the invention and FIG. 2 shows an enlarged detail indicated by the arrow II in FIG. 1.

The piston pump according to the invention, which is indicated as a whole in FIG. 1 by the reference numeral 10, has a sleeve 12 that is inserted into a stepped pump bore 14 of a hydraulic block, which constitutes a pump housing 16. The hydraulic block, of which only a fraction that encompasses the piston pump 10 is shown in the drawing, is part of a slip-controlled hydraulic vehicle brake system that is otherwise not shown. Other hydraulic components besides the piston pump 10, such as solenoid valves and hydraulic reservoirs, are inserted into it and are connected to a master cylinder and to wheel brake cylinders. The hydraulic components are hydraulically connected to one another by means of the hydraulic block.

The sleeve 12 has the form of a hollow cylinder with a sleeve bottom 18 that is of one piece with it. The sleeve 12 contains approximately half the length of a cylindrical piston 20. One end of the piston 20, which is disposed in the sleeve 12, is guided in an axially mobile fashion by a guide ring 26 on an inner surface of the sleeve 12 and is sealed by a sealing ring 28. The other end of the piston 20, which protrudes from the sleeve 12, is guided in an axially mobile fashion by means of a guide ring 22, directly in the pump bore 14 of the pump housing 16 and is sealed against the pump housing 16 by a sealing ring 24.

As a fluid inlet, the piston 20 is provided with an axial blind bore 30, which leads from its end disposed in the sleeve 12 and is intersected in the vicinity of its deepest point by lateral bores 32. By means of the lateral bores 32, the blind bore 30 communicates with an inlet bore 34, which feeds into the pump bore 14, radial to the piston pump 12, at the same level as an open end of the sleeve 12 remote from the sleeve bottom 18.

As an inlet valve 36, the piston pump 10 according to the invention has a spring-loaded check valve, which is attached to the end of the piston 20 disposed in the sleeve 12: a mouth of the blind bore 30 is embodied as a conical valve seat 38, which has a valve ball 40 acting as a valve closing body pressed against it by a helical compression spring acting as a valve closing spring 42. The valve closing spring 42 is supported against a bottom of a cup-shaped valve cage 44, which is produced as a deep-drawn part made of sheet metal and has axial and/or radial passages 46. At its open end, the valve cage 44 has a circumferential annular step 48, with which it rests against the end of the piston 20 disposed in the sleeve 12, and a radial flange 50, with which it is pressed against the end of the piston 20 by a piston restoring spring 52. The valve ball 40 and the valve closing spring 42 are contained in the valve cage 44. The piston restoring spring 52 is embodied as stronger than the valve closing spring 42. The piston restoring spring 52 is supported against the sleeve bottom 18.

In order to set the piston 20 into an axially reciprocating stroke motion, the piston pump 10 according to the invention has a cam 54, which can be driven to rotate by an electric motor, and the piston 20 is pressed against the circumference of this cam by the piston restoring spring 52.

The guide ring 26 and sealing ring 28 disposed in the sleeve 12 are fixed in the axial direction between the radial flange 50 of the valve cage 44 and a piston collar 56 on the piston 20.

In the vicinity of the sleeve bottom 18, a cylindrical stopper element 58 is press-fitted onto the sleeve 12 and serves to close the pump bore 14 in a pressure-tight fashion and to fix the sleeve 12 in the pump housing 16. The stopper element 58 can also be connected to the sleeve 12 by means of a flange connection, where a radial play can be provided between the sleeve 12 and the stopper element 58. An outlet valve 60 in the form of a spring-loaded check valve is accommodated in the stopper element 58: the stopper element 58 has a coaxial blind bore 62 into which are inserted a helical compression spring acting as a valve closing spring 64 and a valve ball 66 acting as a valve closing body. The valve ball 66 cooperates with a conical valve seat 68, which is disposed at a mouth of a central bore 70 that passes axially through the sleeve bottom 18. An outlet of the fluid into a radial outlet bore 74 in the pump housing 16 occurs through radial conduits 72 between the sleeve bottom 18 and the stopper element 58.

In the imaginary extension of the sleeve 12, at its open end, a hollow cylindrical filter 76 is attached, which has approximately the diameter of the sleeve 12. The filter 76 has a tubular filter cloth 78, which has a plastic filter frame 80, 82, 84 cast around it. The filter cloth 78 is comprised of metal or plastic. The filter 76 has a ring 80 at its end oriented toward the sleeve 12 and has a ring 82 at its end oriented toward the cam 54. The two rings 80, 82 are of one piece with each other, connected by means of ribs 84. The ribs 84 and the rings 80, 82 constitute the filter frame 80, 82, 84. An influx into the piston pump 10 travels from the inlet bore 34, between the rings 80, 82 and ribs 84 of the filter frame 80, 82, 84, through the filter cloth 78, and into the open end of the sleeve 12. So that the fluid can flow from the inlet bore 34, through the filter cloth 78 of the filter 76, and into the lateral bores 32 in the piston 20, a circumferential gap is provided between the ring 80 of the filter 76 and the piston 20, or the ring 80 is provided with its own axial openings.

Figure 2:
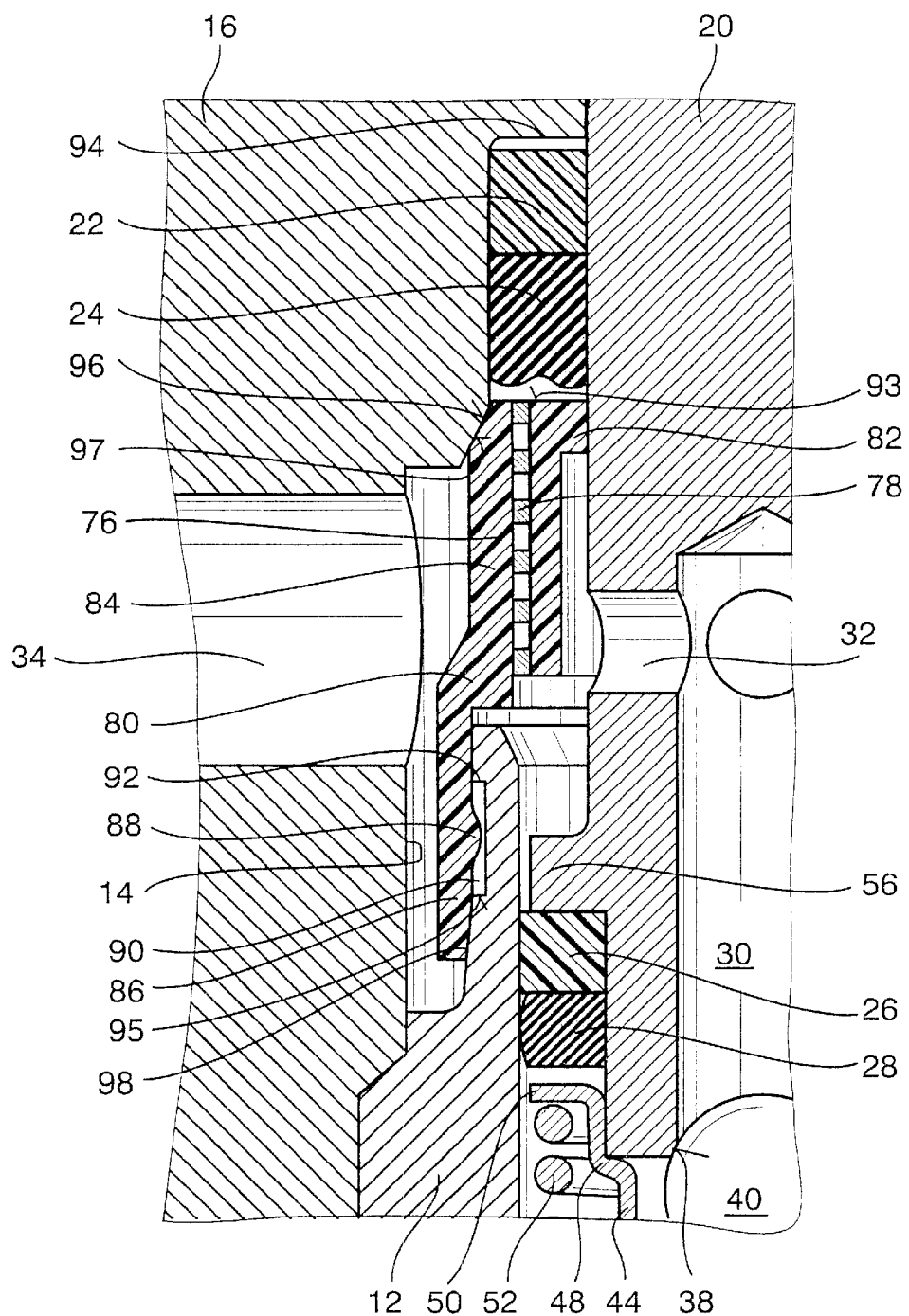

In order to attach the filter 76 to the sleeve 12, the filter 76 has a tubular collar 86, which is of one piece with the ring 80 of the filter 76 oriented toward the sleeve 12, protrudes from this ring in the axial direction, and encompasses an end of the sleeve 12 oriented toward the filter 76. The collar 86 of the filter 76 has a radially inward-protruding, continuous bead 88 that engages in a groove 90, which is wide in the axial direction and is disposed in the outer circumference of the sleeve 12. The essentially continuous bead 88 can also be interrupted at one or several points on the circumference. Thus a groove side wall 92 (FIG. 2) of the groove 90 constitutes an undercut of the sleeve 12, which the bead 88 in the collar 86 of the filter 76 engages behind after the fashion of a snap or detent connection. The groove 90 of the sleeve 12 is wider in the axial direction than the bead 88 of the filter 76 so that the filter 76 is connected to the sleeve 12 so that it can move in the axial direction along a path that is defined by the width of the groove 90. On the opposite side from the groove side wall 92, the groove 90 ends at another groove side wall 95. The filter 76 can move axially in relation to the sleeve 12 until the bead 88 of the filter 76 strikes either against the groove side wall 92 or the opposite groove side wall 95 of the groove 90 of the sleeve 12.

The filter 76 constitutes a captive retainer of the piston 20. The ring 80 of the filter 76 oriented toward the sleeve 12 protrudes radially inward beyond the inner diameter of the sleeve 12. The ring 80 constituting the captive retainer thus engages the piston collar 56 of the piston 20. The ring 80 constitutes a stop which secures the piston 20 in the sleeve 12 in captive fashion.

The filter 76 constituting the captive retainer for the piston 20 performs the function of securing the piston 20 in captive fashion in the sleeve 12, counter to the force of the piston restoring spring 52, until the sleeve 12 is inserted, along with the piston 20, into the pump bore 14 of the pump housing 16. The assembly of the piston pump 10 according to the invention occurs as follows: First, the piston restoring spring 52 is inserted into the sleeve 12 and then the piston 20 with the inlet valve 36 resting against it, the sealing ring 28, and the guide ring 26 are inserted into the sleeve 12. Then, the filter 76 is slid over the piston 20 and is placed with the collar 86 against the sleeve 12. In so doing, the bead 88 of the collar 86 snaps into the groove 90 of the sleeve 12. This snap connection is designed to be strong so that it secures the piston 20 in the sleeve 12 counter to the force of the piston restoring spring 52. Since the piston restoring spring 52 is largely unstressed when the piston collar 56 rests against the ring 80 of the filter 76 comprising the captive retainer, the snap connection 88, 90 is sufficient to affix the filter 76 to the sleeve 12.

Then, the stopper element 58 with the outlet valve 60 is placed against the sleeve bottom 18. The sleeve 12 with the inserted piston 20, the inlet valve 36, the attached filter 76 that constitutes the captive retainer for the piston 20, and the stopper element 58 with the incorporated outlet valve 60 constitute a preassembled unit, which can be inserted completely preassembled into the pump bore 14 of the pump housing 16. Before the insertion of the preassembled unit into the pump bore 14, the sealing ring 24 and the support ring 22 are placed onto the section of the piston 20 protruding from the sleeve 12. The filter 76 has a circumferential end 93 oriented toward the cam 54. When the preassembled unit is inserted into the pump bore 14, the end 93 of the filter 76 slides the support ring 22 and the sealing ring 24 until they contact an annular step 94 of the pump bore 14. In order to assure that the guide ring 22 is slid into the provided position against the annular shoulder 94, the filter 76 is slid with its collar 86 onto the sleeve 12 in a clamping fashion and is pulled back from the sleeve 12 until the bead 88 of the collar 86 rests against the groove side wall 92 of the groove 90 of the sleeve 12, which groove side wall constitutes the undercut. The piston restoring spring 52 presses against the filter 76 by means of the piston collar 56. Before the preassembled unit is inserted into the pump bore 14 of the pump housing 16, the piston restoring spring 52 assures that the bead 88 of the filter 76 rests against the groove side wall 92 of the sleeve 12. The piston restoring spring 52 thus assures that the preassembled unit is inserted in the extended state. Only during the installation of the preassembled unit into the pump housing 16 is the preassembled unit then compressed, where the filter 76 is slid in relation to the sleeve 12, which permits length tolerances in the individual components to be very easily compensated for.

Upon insertion of the preassembled unit of the piston pump 10 into the pump bore 14, the filter 76 strikes with a conical contact surface 96 against an opposing surface 97 of the pump bore 14, against which the filter 76 is axially supported. In the exemplary embodiment that is depicted and described, the contact surface 96 and the opposing surface 97 have a cone angle of 60°. The conicity of the opposing surface 97 of the pump bore 14 is used as an insertion bevel for the insertion of the guide ring 22 and sealing ring 24, which are mounted onto the piston 20, into the end of the pump bore 14 oriented toward the cam 54. Also due to its conicity, the opposing surface 97 of the pump bore 14 centers the filter 76 in the pump bore 14 and facilitates the insertion of the preassembled unit into the pump bore 14. The contact surface 96 determines the final axial position of the filter 76 in the pump bore 14. Once the filter 76 comes to rest with its contact surface 96 against the opposing surface 97 of the pump bore 14, only the sleeve 12 can slide further into the pump bore 14; the filter 76 travels no further. As a result, the bead 88 of the filter 76 moves axially away from the groove side wall 92 of the sleeve 12. Since the axial position of the filter 76 is exactly predetermined by its contact surface 96 in the pump bore 14, an axial distance between the end 93 of the filter 76 and the annular shoulder 94 of the pump bore 14 can be very precisely set. As a result, it is possible to fix the sealing ring 24 with a slight amount of axial play in the pump bore 14. This prevents both a large amount of axial mobility of the sealing ring 24 and an axial compression of the sealing ring 24 from being brought about by manufacturing and assembly tolerances of the preassembled unit comprised of the piston 20, the sleeve 12, the attached filter 76, and the stopper element 58.

The clamped attachment of the filter 76 to the sleeve 12, which connection can become axially mobile when the clamping force is surmounted, is achieved by means of a conical clamping surface 98 on the inside of the collar 86 of the filter 76, which rests in a frictionally engaging manner against a conical opposing surface on the outside of the sleeve 12. The conical opposing surface tapers the outside of the sleeve 12 toward an open end of the sleeve 12 oriented toward the cam 54. The clamping surface 98 is provided on a side of the bead 88 oriented toward the sleeve 12.

The foregoing relates to preferred exemplary embodiments of the invention, it being understood that other variants and embodiments thereof are possible within the spirit and scope of the invention, the latter being defined by the appended claims.

We claim:

1. A piston pump comprising a pump housing, a piston that can be driven to execute a reciprocal stroke motion, the piston being contained in an axially mobile fashion over a part of its length in a sleeve adapted to be inserted into the pump housing, and a tubular filter attached to one end of the sleeve and encompassing a section of the piston protruding from the sleeve, the filter constituting a captive retainer for the piston the filter being engaged in an undercut of the sleeve and securing the piston in the sleeve, the filter (76) being attached to the sleeve (12) in an axially mobile fashion.

2. The piston pump according to claim 1, wherein, in order to attach the filter (76) to the sleeve (12), the filter (76) engages the undercut (92) of the sleeve (12) in the fashion of a snap or detent connection.

3. The piston pump according to claim 1, wherein the filter (76) is attached to the sleeve (12) in a clamped fashion.

4. The piston pump according to claim 3, the clamping is produced by means of a conical surface (98) of the sleeve (12).

5. The piston pump according to claim 3, wherein the clamping is produced by means of a conical surface (98) of the filter (76).

6. The piston pump according to claim 1, wherein the filter (76) has a contact surface (96) in order to be axially supported in the pump housing (16).

* * * * *